US011905675B2

(12) United States Patent
Kelley et al.

(10) Patent No.: US 11,905,675 B2
(45) Date of Patent: Feb. 20, 2024

(54) VISION-BASED BLADE POSITIONING

(71) Applicant: Topcon Positioning Systems, Inc., Livermore, CA (US)

(72) Inventors: Donna Kelley, Louisville, CO (US); Aleksandr Aleksandrovich Pimenov, Saint Petersburg (RU); Alexey Vedernikov, Saint Petersburg (RU); Ivan Bogdanyuk, Primorsky Krai (RU); Mikhail Nikolaevich Smirnov, Saint Petersburg (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 902 days.

(21) Appl. No.: 16/532,331

(22) Filed: Aug. 5, 2019

(65) Prior Publication Data
US 2021/0040708 A1 Feb. 11, 2021

(51) Int. Cl.
*G01C 21/20* (2006.01)
*E02F 3/84* (2006.01)
*E02F 9/26* (2006.01)
*G01B 9/02* (2022.01)
*G01C 15/00* (2006.01)

(52) U.S. Cl.
CPC .............. *E02F 3/847* (2013.01); *E02F 9/264* (2013.01); *G01B 9/02* (2013.01); *G01C 15/006* (2013.01)

(58) Field of Classification Search
CPC ......... E02F 3/847; E02F 9/264; E02F 3/7627; E02F 3/7631; E02F 3/844; E02F 3/437; E02F 3/434; E02F 3/845; E02F 9/265; G01B 9/02; G01C 15/006; G01C 21/165; G01C 21/20
See application file for complete search history.

(56) References Cited

U.S. PATENT DOCUMENTS

| 3,226,859 | A | * | 1/1966 | Kampert | ............... | E02F 3/7618 |
| | | | | | | 172/826 |
| 3,628,612 | A | * | 12/1971 | Liess | ..................... | E02F 3/8157 |
| | | | | | | 172/821 |
| 5,612,864 | A | * | 3/1997 | Henderson | .............. | G01S 19/44 |
| | | | | | | 356/3.01 |
| 5,996,702 | A | * | 12/1999 | Hall | ........................ | E02F 9/26 |
| | | | | | | 701/50 |

(Continued)

FOREIGN PATENT DOCUMENTS

| JP | 2007148784 A | 6/2007 |
| JP | 2016035461 A | 3/2016 |
| JP | 2019521403 A | 7/2019 |

OTHER PUBLICATIONS

International Search Report and Written Opinion dated Oct. 1, 2020, in connection with International Patent Application No. PCT/US2020/038869, filed Jun. 22, 2020, 11 pgs.

(Continued)

*Primary Examiner* — Edwin J Toledo-Duran
(74) *Attorney, Agent, or Firm* — Chiesa Shahinian & Giantomasi PC

(57) ABSTRACT

A vision-based sensor system is provided for heavy equipment or other machinery that determines the pose or position of the blade with respect to the heavy equipment vehicle where the sensor system comprises a vision-based blade position system having an image acquisition device and vision system processor.

22 Claims, 8 Drawing Sheets

(56) References Cited

U.S. PATENT DOCUMENTS

| | | | | |
|---|---|---|---|---|
| 6,389,785 | B1* | 5/2002 | Diekhans | A01B 69/008 172/4.5 |
| 6,721,657 | B2* | 4/2004 | Ford | G01C 21/165 701/472 |
| 7,139,662 | B2* | 11/2006 | Ericsson | E02F 3/847 340/991 |
| 8,478,492 | B2* | 7/2013 | Taylor | E02F 3/842 701/485 |
| 8,972,119 | B2* | 3/2015 | Morin | G01C 21/20 701/50 |
| 9,139,977 | B2 | 9/2015 | McCain et al. | |
| 9,567,731 | B2* | 2/2017 | Darukhanavala | E02F 9/264 |
| 9,650,763 | B2 | 5/2017 | Taylor et al. | |
| 10,217,488 | B1* | 2/2019 | Huang | G06F 3/0346 |
| 10,789,744 | B2 | 9/2020 | Edelman et al. | |
| 11,122,740 | B2* | 9/2021 | Middelberg | A01D 69/03 |
| 2007/0081695 | A1* | 4/2007 | Foxlin | G06R 7/73 382/103 |
| 2008/0109141 | A1* | 5/2008 | Nichols | G01C 21/1652 701/50 |
| 2010/0121540 | A1* | 5/2010 | Kumagai | G01S 5/163 701/50 |
| 2011/0169949 | A1* | 7/2011 | McCain | E02F 3/847 348/148 |
| 2012/0130602 | A1* | 5/2012 | Omelchenko | E02F 3/842 701/50 |
| 2012/0239258 | A1* | 9/2012 | Konno | E01C 19/004 701/50 |
| 2012/0263566 | A1* | 10/2012 | Taylor | E02F 3/437 701/50 |
| 2012/0296529 | A1* | 11/2012 | Peake | A01M 7/0089 701/50 |
| 2014/0277956 | A1* | 9/2014 | Morin | G01C 21/20 701/50 |
| 2015/0153191 | A1* | 6/2015 | Ma | G01C 21/34 701/410 |
| 2015/0168136 | A1* | 6/2015 | Kamat | E02F 9/264 348/136 |
| 2018/0144523 | A1 | 5/2018 | Edelman et al. | |
| 2020/0355499 | A1* | 11/2020 | Hinderling | G01C 1/04 |
| 2021/0062473 | A1* | 3/2021 | Ding | G06F 3/1446 |
| 2021/0291733 | A1* | 9/2021 | Ding | B60R 1/00 |
| 2022/0317842 | A1* | 10/2022 | Kumakura | B60K 35/00 |
| 2023/0003524 | A1* | 1/2023 | Walser | G01C 15/002 |

OTHER PUBLICATIONS

Decision to Grant dated Nov. 22, 2023 in connection with Japanese Patent Application No. 2022-507457, filed Feb. 4, 2022, 5 pgs (including translation).

Communication Pursuant to Article 94(3) EPC dated Dec. 12, 2023 in connection with European Patent Application No. 20737797.9, filed Dec. 29, 2021, 7 pgs.

* cited by examiner

VISION-BASED BLADE POSITIONING

TECHNICAL FIELD

The present invention relates to determining the position of a work implement having a working edge and, more particularly, to a method and apparatus for a sensor system for determining blade pose or position with respect to a machine.

BACKGROUND

Heavy construction machinery (e.g., bulldozers, graders, tractors, pavers, front end loaders, backhoes, etc.) typically have one or more working edges (e.g., blades) that are used to perform specific functions. As used herein, the term working edge refers generally to any component of heavy equipment that performs a specific function in which precise positioning is necessary, for example, working edges may include the blade of a dozer or grader, or the scoop of a backhoe, to name just a few.

The user of heavy equipment will utilize the working edge to perform a range of typical worksite functions (e.g., using the blade of a dozer to level a section of the worksite to some desired grade and width). This work is continually checked during operation of the heavy equipment to ensure compliance with applicable worksite requirements or specifications. For example, this typically requires an iterative process until reaching the desired grade and width and verification against the specification.

As such, equipment manufacturers typically provide their heavy equipment with some type of automatic working edge positioning system to assist the user and increase productivity by precisely guiding the user while working with the heavy equipment across the worksite. One conventional working edge control system employs one or more sensors affixed to the working edge to monitor location and/or orientation with respect to a fixed point on the heavy equipment vehicle. For example, the working edge position information is relayed, via one or more cables, to a control system located within the cab section of the vehicle. The location of the heavy equipment vehicle can be provided by a multiplicity of methods including but not limited to LPS (local positioning system), SLAM (simultaneous location and mapping) based on either vision or light detection and ranging LIDAR (light detection and ranging) systems, or well-known task-centered localization methods. For example, the heavy equipment vehicle may have a global navigation satellite system (GNSS) receiver that provides accurate location of the machine in a well-known manner. This location information in combination with the relayed blade position is utilized by the working edge control system to accurately grade and/or level the worksite.

One disadvantage of such sensor-based working edge control systems is that the sensors are very sensitive components that are mounted on the working edge and are subject to damage risks associated with harsh working environments. For example, large mechanical stresses applied to the heavy equipment during operation, and dirt or other material striking the sensors can cause these components to malfunction, become misaligned, and/or require recalibration.

Therefore, a need exists for an improved sensor technique for precisely determining blade pose or position with respect the machine during normal heavy equipment operations.

SUMMARY

In accordance with various embodiments, a vision-based sensor system is provided for heavy equipment that determines the pose or position of the blade with respect to the heavy equipment vehicle.

In accordance with an embodiment, an image acquisition device (e.g., a single camera) is established as a single POV to determine blade position by using azimuthal projections that maps particular points of interest on or about the blade (e.g., upper corners of the blade) in an image plane to particular rotations in a machine reference frame. In this way, a vision-based sensor system is employed for image analysis for the acquisition and tracking of one or more points of interest (POI), e.g., at the blade corners. This working edge location information is acquired from images captured by the image acquisition device and the location information is computed in a coordinate system specific to the vision system. The working edge location information may be transformed into a GNSS coordinate system (or some other method of determining the location and orientation of the associated heavy equipment such as LIDAR) so that the information may be utilized to control the blade of the associated heavy equipment (e.g., bulldozer).

In accordance with the embodiment, the vision-based sensor system provides for accurate determination of the blade position with respect to the heavy equipment. Illustratively, the image acquisition device (e.g., a single camera) is mounted on the heavy equipment with a fixed field of view of a spatial region about the blade (e.g., the blade's upper edge having respective upper corners). Illustratively, the vision system identifies the blade's upper edge (i.e., a first corner and a second corner defining two respective POIs) of the blade with such corner(s) falling on a surface of a sphere (i.e., a spherical surface of interest, as mathematically established by the vision system) encompassing the blade and with each corner movement being confined to a so-called respective patch on the spherical surface of interest. The vision system, after identifying these first and second corners of the blade in an image taken by the image acquisition device, then uses an azimuthal projection for mapping the sphere to a picture plane that is forward of the image acquisition device. That is, in accordance with the embodiment, an azimuthal projection with an appropriate radius ($R_E$) of the spherical surface of interest bijectively maps the corner locations on the sphere to locations on a plane. In this way, the respective corners are identified within the acquired image and their location calculated in the vision system coordinate system such that perspective projections are employed for the single POV (and thereby eliminating the need for a second camera). In accordance with the embodiment, the position of the respective blade corners (in their respective first and second patches) and thus the working blade edge is determined in terms of an X, Y, Z location and/or rotation based on the coordinate system centered on the vision system.

In accordance with the embodiment, a calibration is performed at the time of installation to determine location(s) and length(s) of certain features of the associated heavy equipment (e.g. bulldozer) which are required to complete the calculation of the blade position by so-called reverse projection. The calibration will generally consist of a combination of measurements between specific accessible features on the associated heavy equipment and the corresponding locations of those features in the camera image. From these measurements the required locations and lengths of certain features of the associated heavy equipment can be calculated.

In accordance with the embodiment, the calibration is performed to acquire the transformation from the visual system to the machine frame of reference only. Where GNSS is present, a second transformation may be applied to generate the location of the blade's working edge in terms of the GNSS system's coordinate system which may then be used to control the blade and/or heavy equipment for performing a particular function on the worksite (e.g., accurately grading).

According to one embodiment, a vision system for determining a position of an implement attached to a machine includes an image acquisition device for taking an image of the implement. The image acquisition device is positioned (1) to view at least two points of interest located distally on the implement such that the points of interest are visible in the image for an entire range of motion of the implement, and (2) such that any combination of motions of the implement sharing an origin will cause the points of interest to be mapped to an image plane of the image acquisition device by an azimuthal projection. In one example, the points of interest may be associated with a respective target affixed to the implement. The vision system further comprises a processor and memory for calculating respective locations of the points of interest in a frame of reference of the vision system by reversing a projection of the points of interest in the image using respective locations of the points of interest in the image and a known geometry of an articulation of the implement about the machine.

In one illustrative embodiment, the vision system is calibrated by collecting, for a plurality of positions of the implement representing a motion of the implement about a respective center of rotation for each position of the plurality of positions, a plurality of images and a plurality of distances associated with the at least two points of interest. A respective location for each of the respective centers of rotation in the vision system frame of reference can then be calculated. In one example, the machine is a bulldozer and the implement is a blade and the points of interest are located at respective upper distal corners of the blade. The ball joint of the blade may have a finite range of rotational motion about a center thereof such that the ball joint is carried by and in an arc of fixed radius about a fixed axis of rotation on a C-frame of the bulldozer.

These and other advantages of the invention will be apparent to those of ordinary skill in the art by reference to the following detailed description and the accompanying drawings.

DETAILED DESCRIPTION

In accordance with various embodiments, a vision-based sensor system is provided for heavy equipment that determines the pose or position of the blade with respect to the heavy equipment vehicle.

Figure 1:
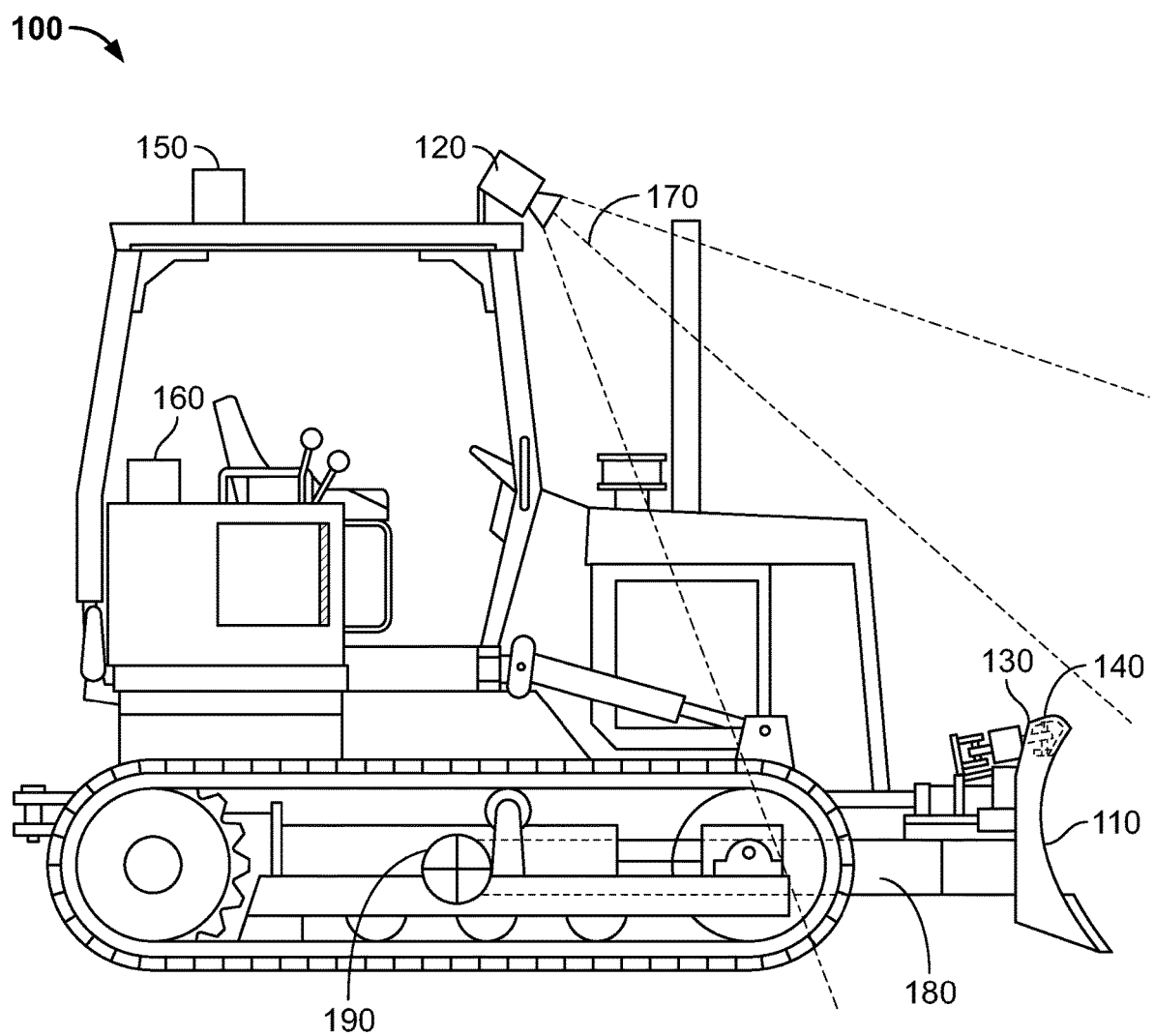
FIG. 1 shows an exemplary heavy equipment vehicle configured in accordance with an embodiment.

FIG. 1 shows an exemplary heavy equipment vehicle configured in accordance with an embodiment. More particularly, bulldozer 100 (also referred herein as dozer 100) illustratively comprises a working edge (i.e., blade 110) and image acquisition device 120 (e.g., a single camera) mounted on the cab roof of bulldozer 100 to obtain image(s) of one or more POI 140 associated with the blade (e.g., blade top edge 130). It will be noted that in FIG. 1, the image acquisition device 120 is mounted on the roof of dozer 100 but there are a variety of other suitable mounting positions for the image acquisition device 120. For example, an alternate mounting position may be on the front grill of dozer 100 or any other position that is close enough to blade 110 with certain line of sight characteristics (as will be further discussed below). Further, pivot location 190 (e.g., a ball joint) for C-frame 180 of bulldozer 100 in the vision system frame of reference is shown and will be discussed further herein below with respect to the calibration operation. The one or more POI 140 may generally be at or near the uppers corners of blade edge 130 of blade 110 but are not necessarily (in all cases) the corners themselves. For example, a POI 140 might be somewhat inboard and below the top of blade 110. Antenna 150 is used in a variety of well-known to enable dozer 100 to send and receive communications signals, and positioning system 160 is used in a conventional manner to provide location and heading information. As shown, in accordance with embodiment, image acquisition device 120 has a fixed field of view 170 of a spatial region about blade 110 (and the blade's top edge, e.g., blade top edge 130). It will be noted that while the description herein involves bulldozer 100 having blade 110, the principles of the embodiments are equally applicable to any type of heavy equipment or other machinery employing a working edge. It will also be noted that the proportions shown in FIG. 1 are not to scale and are representative in nature.

Figure 2:
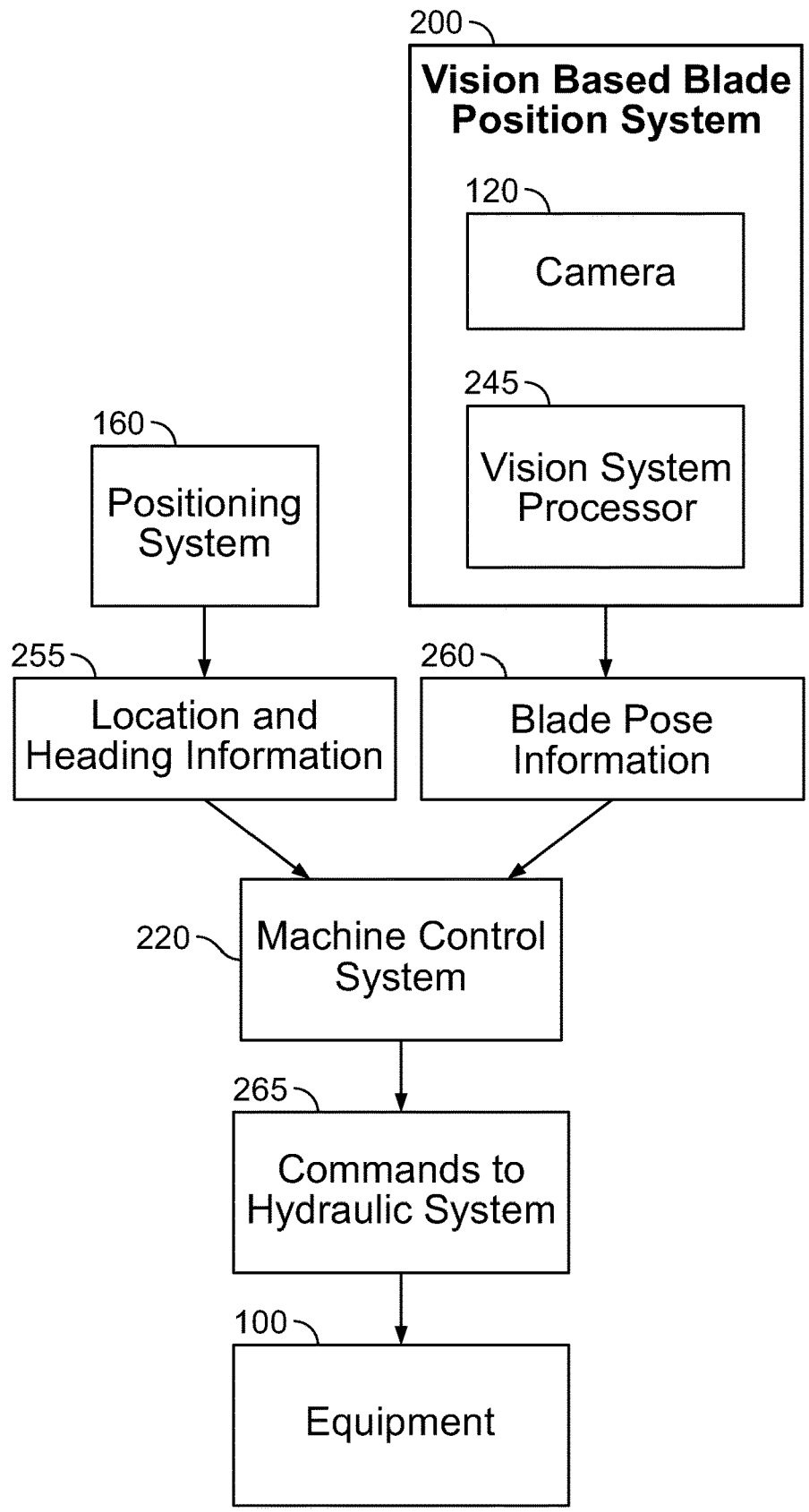
FIG. 2 shows an exemplary sensor system for determining blade pose or position with respect to a machine in accordance with an embodiment.

FIG. 2 shows an exemplary sensor system for determining blade pose or position with respect to a machine in accordance with an embodiment. In particular, the sensor system comprises vision-based blade position system 200 having camera 120 and vision system processor 245. Illustratively, positioning system 160 provides location and heading information 255 in a conventional manner associated with bulldozer 100 to machine control system 220. Machine control system 220 further receives blade pose information 260 as processed by vision system processor 245 in vision-based blade position system 200 with respect to the position of blade 110 to facilitate the transmission of hydraulic system commands 265 to the heavy equipment (i.e., dozer 100), the details of which will now be further discussed.

As noted above, the embodiments herein employ image analysis to acquire and track point(s) of interest on or about a blade (e.g., blade 110) without the need for specialized targets affixed to the blade and using a single camera (e.g., camera 120). Illustratively, as noted above, the point(s) of interest in accordance with the embodiments represent fixed locations that are on or near the blade's edge (e.g., upper corners of the blade's edge). The visual characteristics of the blade's features such as linear features (e.g., edges, line elements, etc.), parallel features, fixed angles (e.g., right angles), silhouettes, texture and color may be employed (either alone or in any combination) to enhance the delivery of the vision-based blade positioning of the disclosed embodiments. These features can be grouped into three basic criteria that define the signature of a particular POI: appearance (e.g., luminance, color, texture, and variations thereof), geometry (e.g., scale, shape, proportion and orientation), and location (e.g., port vs. starboard side, last known location, and trajectory). The points of interest may be acquired by evaluating the visual features using various object recognition operations by way of example.

The vision-based blade position system in accordance with the disclosed embodiments allows for the capture of blade motion in a number of degrees of freedom (i.e., a degree of freedom being any opportunity for translation or rotation within a frame of reference) such as rotation, slope, elevation, tilt, and shift and utilizes certain azimuthal projections (as will be further disclosed below) related thereto. As will be appreciated, the rotation, slope, and tilt of the blade typically share a center of rotation so that the motion of features on the blade equidistant from the center of rotation (e.g. the respective upper corners of the blade i.e., the corners of the blade furthest from the ground which is being graded) lie on the surface of a sphere (in terms of mathematic representation). For this reason, an azimuthal projection with an appropriately located projection point bijectively maps the locations of interest on the sphere to locations on a plane which can used for positioning the blade in accordance with the embodiments herein. If the projection point corresponds to the aperture of the camera of the vision system this is a unique mapping of the locations of the features of the blade (e.g. corners) to locations in the image plane. Reversal of this projection (i.e. calculation of the positions of the subject features of the blade in the frame of reference of the vision system) requires knowledge of the distance between those features and their respective distances to the center of rotation (calculated during calibration).

Figure 3:
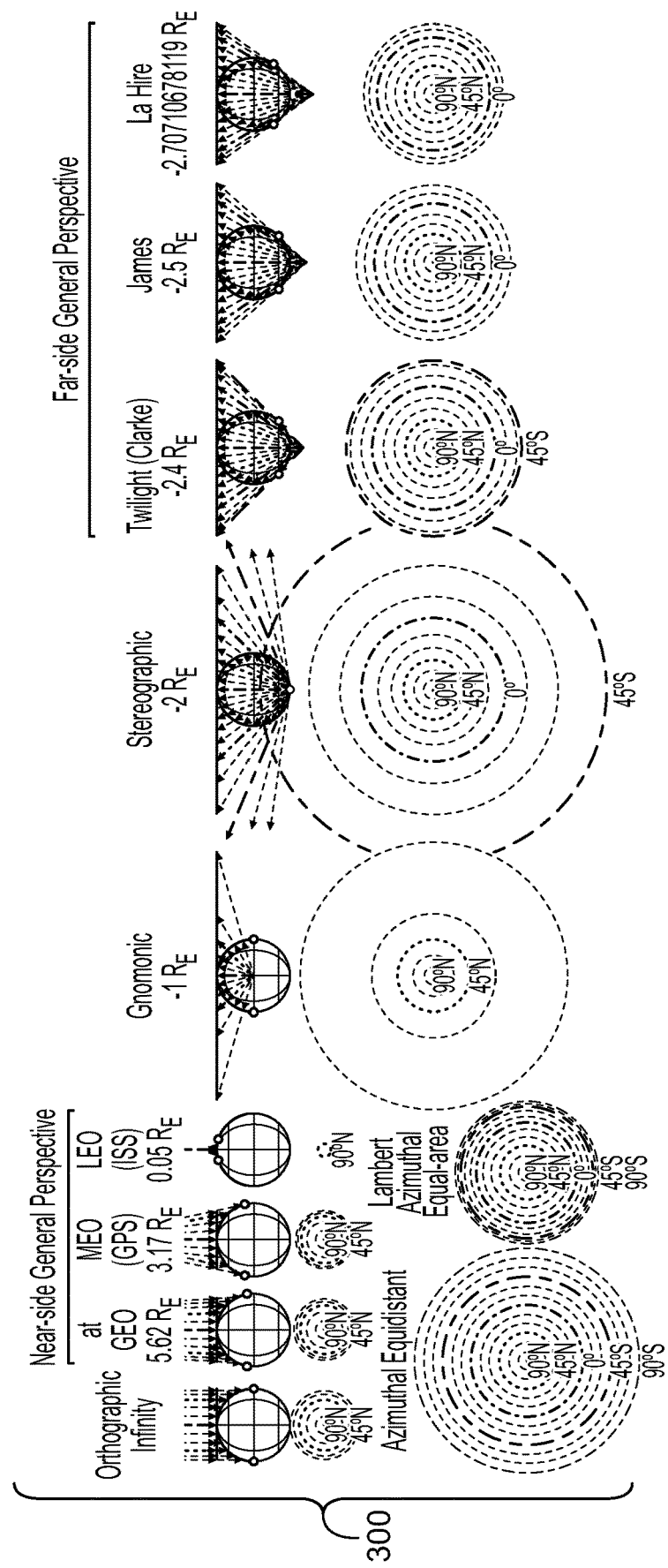
FIG. 3 shows a variety of illustrative azimuthal projections using a single camera in accordance with an embodiment.

For example, FIG. 3 shows a variety of forms of azimuthal projections 300 employing a single camera that may be useful in the embodiments herein and which will be further discussed herein below. To include elevation (e.g. articulation of the C-frame and ball joint of a dozer) requires additional calibration data because the center of rotation that controls elevation (e.g. axis of rotation of C-frame of a dozer) is necessarily distal from the center of rotation for the previously discussed degrees of freedom (e.g. the ball joint of a dozer). Knowledge of the distance between the two previously discussed centers of rotation (e.g. the radius of ball joint motion about the C-frame axis) is sufficient in this case. In general, addition of degrees of freedom for positioning of the blade will require corresponding geometric definition (e.g. radius between centers in the chain of articulations and the geometric position of any stationary centers).

Figure 4A:
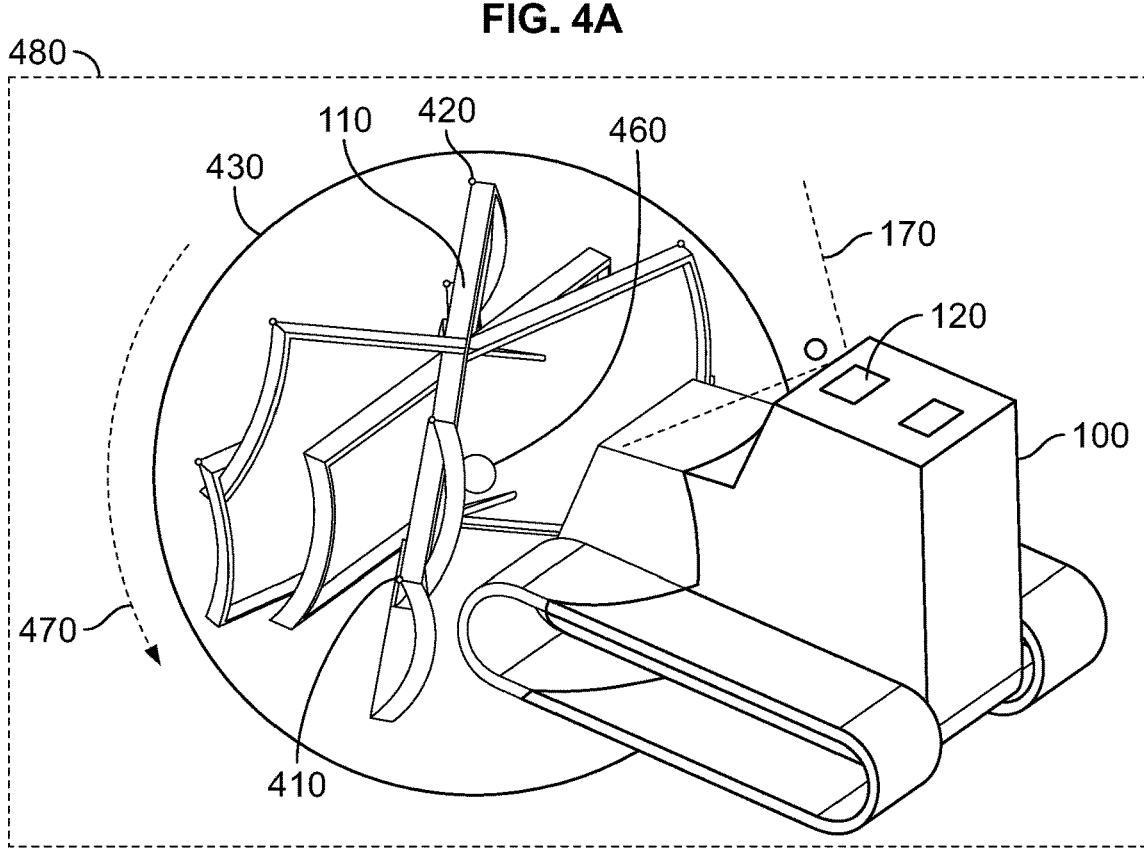
FIGS. 4A and 4B show an example of blade motion determination in accordance with an embodiment for the heavy equipment vehicle of FIG. 1.
Figure 4B:
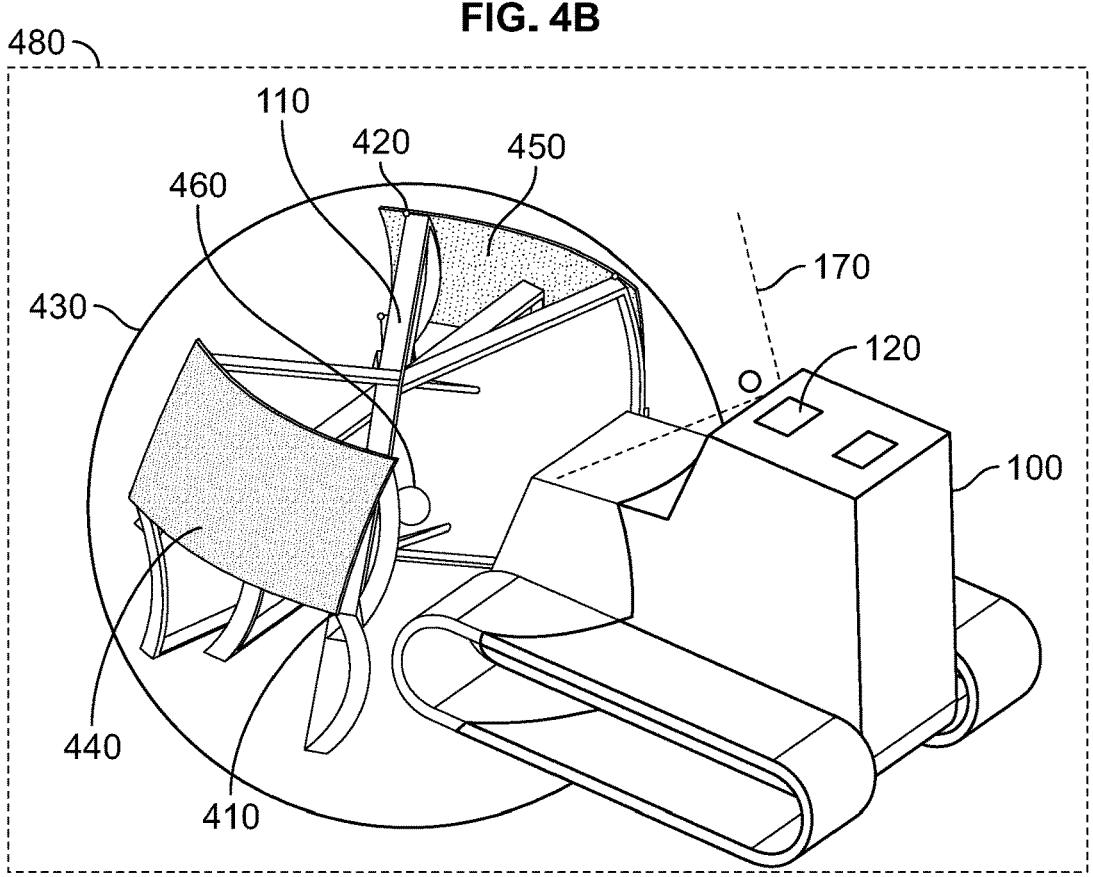

FIGS. 4A and 4B show an example of blade motion determination in accordance with an embodiment for the heavy equipment vehicle of FIG. 1. As shown, in FIG. 4A and FIG. 4B, which shall be discussed together, bulldozer 100 with blade 110 is in motion 470 about worksite 480. In accordance with the embodiment, image acquisition device 120 (e.g., a single camera) mounted on the cab roof of bulldozer 100 will be used to obtain image(s) of one or more POI associated with the blade (e.g., first corner 410 and second corner 420 along the blades upper edge). Illustratively first corner 410 is the upper left corner of blade 110, and second corner 420 is the upper right corner of blade 110 as viewed from image acquisition device 120. As detailed above, these upper corners of blade 110 will always fall (in a mathematical sense) on the surface of sphere 430 (i.e., the spherical surface of interest) which is centered on the intersection 460 of the axes of motion of blade 110. In accordance with the embodiment, each corner movement is confined to a so-called patch. Illustratively, first corner 410 is confined to first patch 440 and second corner 420 is confined to second patch 450 (as shown in FIG. 4B).

Image acquisition device 120 is employed to obtain location information of first corner 410 and second corner 420 and therefore, the working edge (i.e., blade 110) location on which these corners reside in accordance with the embodiment. One or more images of each of first corner 410 and second corner 420 are obtained as blade 110 moves through the fixed field of view 170 of image acquisition device 120. In accordance with the principles of the embodiments herein, all tracking and vision-based calculations are performed using locations of visual features which can be persistently identified on the blade. These features may or may not be the upper corners. If the features used for location are not the upper corners then the locations of the upper corners will not be calculated. Further, the locations of the two (2) features must be distal and located generally near the upper corners. If the features are symmetrically located on the blade then they will fall on the same sphere, but this is not a requirement. If the radial distance between the features and the ball joint differ, then they will each lie on concentric spheres with corresponding radii.

Figure 5A:
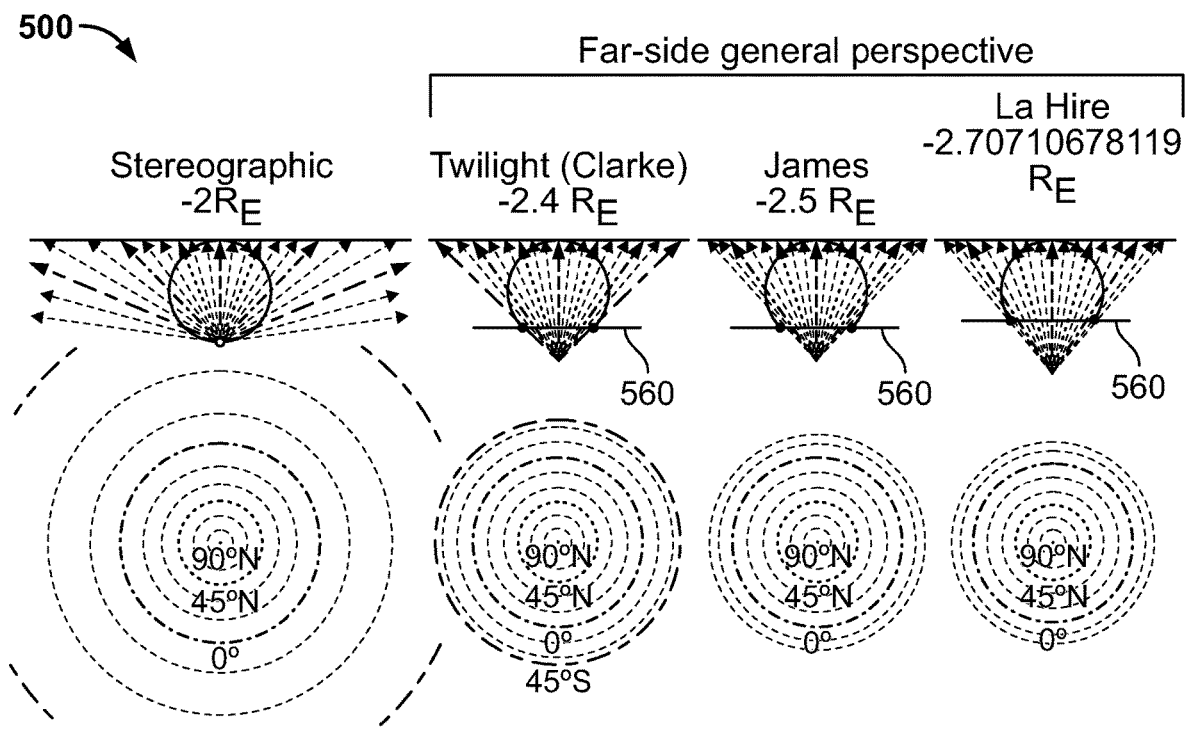
FIGS. 5A and 5B show an illustrative azimuthal projection which maps a sphere to a picture frame for the blade motion determination of FIGS. 4A/B in accordance with the embodiment.
Figure 5B:
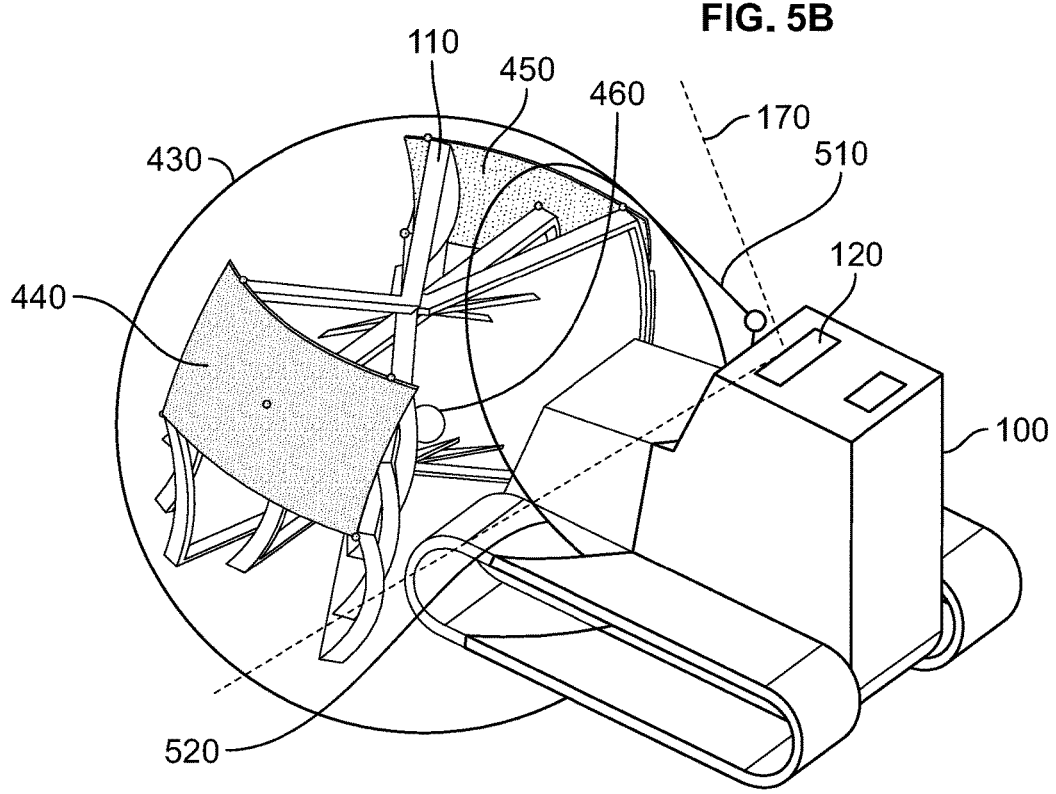

As noted previously, azimuthal projections are employed to map sphere 430 to a picture frame. FIGS. 5A and 5B show an illustrative azimuthal projection which maps the sphere to the picture frame for the blade motion determination of FIGS. 4A and 4B in accordance with the embodiment. As noted above, azimuthal projections are used in the vision-based sensor technique herein for mapping the sphere (i.e., the spherical surface of interest on which the motion of the above-described blade corners respectively lie on) to a picture frame, and these will now be discussed to further the understanding of the disclosed embodiments. FIG. 5A shows certain illustrative azimuthal projections 500 having tangent line 560. The type of azimuthal projections corresponding to the use of a single camera in accordance with an embodiment are referred to as "far-side general perspective" type and have the property of visualizing a portion of the interior of a spherical surface from a point near to, but outside of the corresponding sphere. As shown in FIG. 5A, the far side projection (i.e., $R_E<-2$) maps the hemisphere through a practical lens. As shown, the POV (as defined by image acquisition device 120) must be near enough to visualize both patches (i.e., first patch 440 and second patch 450) from the interior of bulldozer 100. In this way, as shown in FIG. 5B, sphere 430 is trimmed by tangent cone 510 from the POV (see also tangency 520 in FIG. 5B, e.g., along tangent line 560) such that in this illustrative example $R_E$ is approximately −2.4.

Referring back to FIG. 2, the images from image acquisition device 120 (illustratively shown as a camera) are processed by vision system processor 245 for determining the location of first corner 410 and second corner 420 in the vision system coordinate system of vision-based blade position system 200. In this way, vision-based blade position system 200 identifies the location of the working edge (i.e., blade 110) within the vision system coordinate system by using, illustratively, a predetermined spatial relationship established for the first corner 410 and second corner 420.

Illustratively, fixed field of view 170 encompasses the spatial region through which first corner 410 and second corner 420 move through during the operation of blade 110. Image acquisition device 120 is calibrated (e.g., at the time of installation) to establish a scale for the acquired images that defines a relationship (in image pixels) between first corner 410 and second corner 420. This facilitates the establishment of a baseline as to scale and location of the respective corners within the field of view. Illustratively, a home position for blade 110 (and, in turn, first corner 410 and second corner 420 of the blade's edge) is acquired. By establishing a baseline the identification of the location of the first corner 410 and/or the second corner 420 is facilitated as they move through the field of view 170. During operation, image acquisition device 120 obtains the image(s) within the fixed field of view 170 and vision processor 245 locates first corner 410 and second corner 420 within each image. The calibration may also include correcting for distortion in the lens of the camera in a well-known manner. Additional aspects of the aforementioned calibration are discussed herein below.

Further, if the working edge is raised then the location of first corner 410 and second corner 420 will be raised. Similarly, if the working edge is moved to the left or right and/or rotated, the location of first corner 410 and second corner 420 within the field of view will be correspondingly shifted and/or rotated. In this way, vision-based blade position system 200 outputs a set of working edge information (e.g., blade pose information 260) to machine control system 220 which may combine such information with navigation information provided by a conventional GNSS system in a well-known manner.

Figure 6:
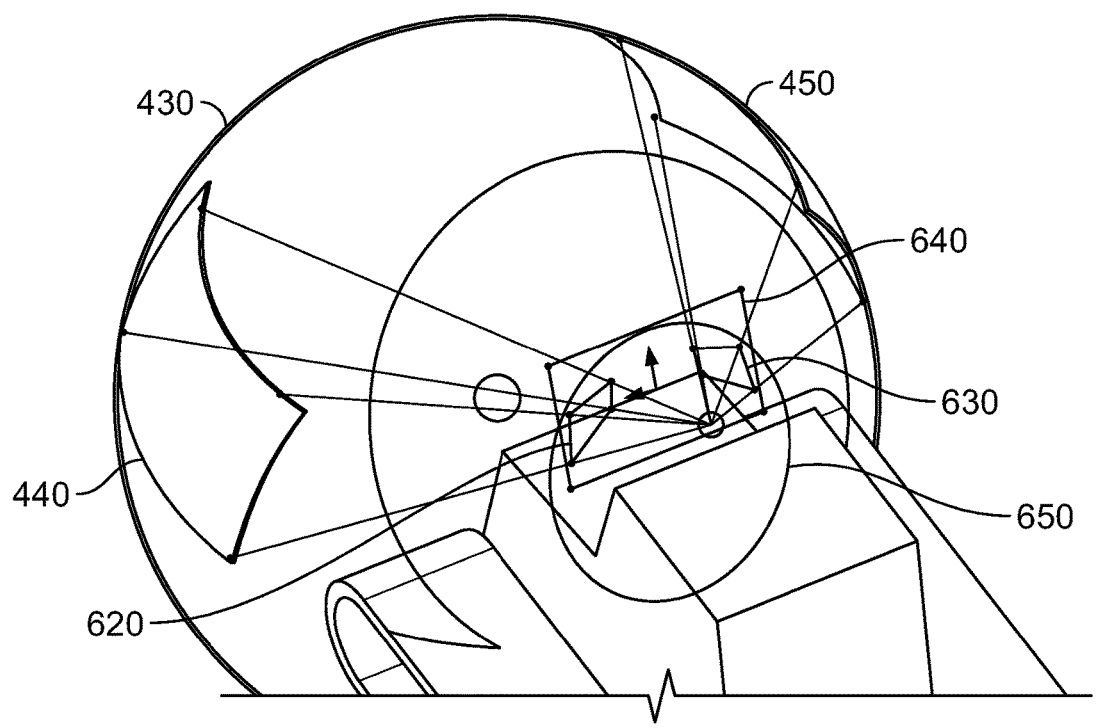
FIG. 6 shows an illustrative mapping the spherical patches in FIGS. 5A/B to an image in accordance with the embodiment.

FIG. 6 show an illustrative mapping using the azimuthal projection of the spherical patches 440 and 450 in FIGS. 5A/B to image 640 in accordance with the embodiment. As shown in FIG. 6, image 640 is established with an image boundary 650 of the projectable surface in the image such that blade corner 410/patch 440 are associated with port patch 620 in image 640, and blade corner 420/patch 450 are associated with starboard patch 630 in image 640. To analyze one or more additional degrees of freedom from image 640 further constraints may be utilized. Illustratively, given the data from the calibration, and the pixel locations of the location features on the blade for a given image, the locations of the location features in the vision system frame of reference can be expressed in terms of a single unknown corresponding to the orientation (i.e. angle) of the C-frame in the vision system frame of reference.

Figure 7:
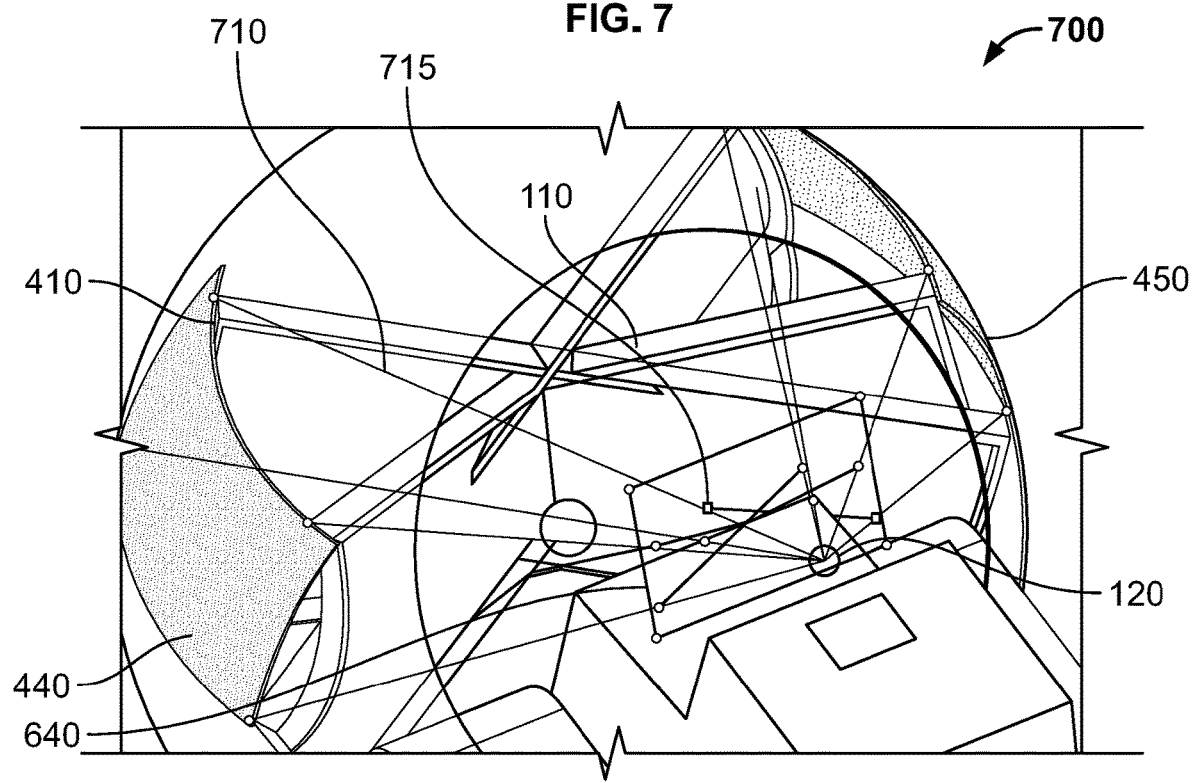
FIG. 7 shows the illustrative blade image in accordance with the mapping of FIGS. 5A/B and FIG. 6 in accordance with the embodiment.

FIG. 7 shows an illustrative blade image 700 in accordance with the mapping of FIGS. 5A/B and FIG. 6 in accordance with the embodiment. As noted above, given the data from the calibration above, and the pixel locations of the location features on the blade for a given image, the locations of the location features in vision system frame of reference can be expressed in terms of a single unknown corresponding to the orientation (i.e. angle) of the C-frame in the vision system frame of reference. Illustratively, the overall calibration is comprised of (1) a factory calibration and (2) an installation calibration.

For factory calibrations (i.e., camera/lens system distortion correction to establish a mapping of pixel locations to angular space in the vision system frame of reference), the calibration to correct distortion is performed one time at the factory and provides for accurate mapping of pixel location in image to angular space in the vision system frame of reference. Calibration at time of installation to the machine is required and is accomplished in a number of stages depending on the degrees of freedom and arrangement of the articulation of the blade. For a dozer with blade mounted to a ball joint, the calibration must find the radius of the sphere (centered on the ball) corresponding to each of the two (2) feature locations, and the location of the axle or pivot of the c-frame in the vision system frame of reference. The former is accomplished by positioning the blade to the extremes of its articulation (as practical) and for each pose obtained, the distance 710 between the location feature (corresponding to "upper corners" e.g. 410) and the camera 120 are recorded along with the pixel location 715 in the image 640 of the location feature. During this procedure, the C-frame (e.g., C-frame 180) must remain stationary. Measurements corresponding to the four (4) extreme poses in combination with the distance between the features on the blade is sufficient to calculate the radius of the sphere (centered on the ball) corresponding to each of the two (2) feature locations. The latter is accomplished by rotating the c-frame about its axis and recording the distances between the locations features and the camera along with the corresponding pixel locations in the image. Four (4) positions of the C-frame are sufficient for the calculation of the location and orientation of the axis and plane of rotation of the C-frame. In a similar fashion additional degrees of freedom which do not share origins of rotation with those previously captured can be characterized for use in pose calculation.

Figure 8:
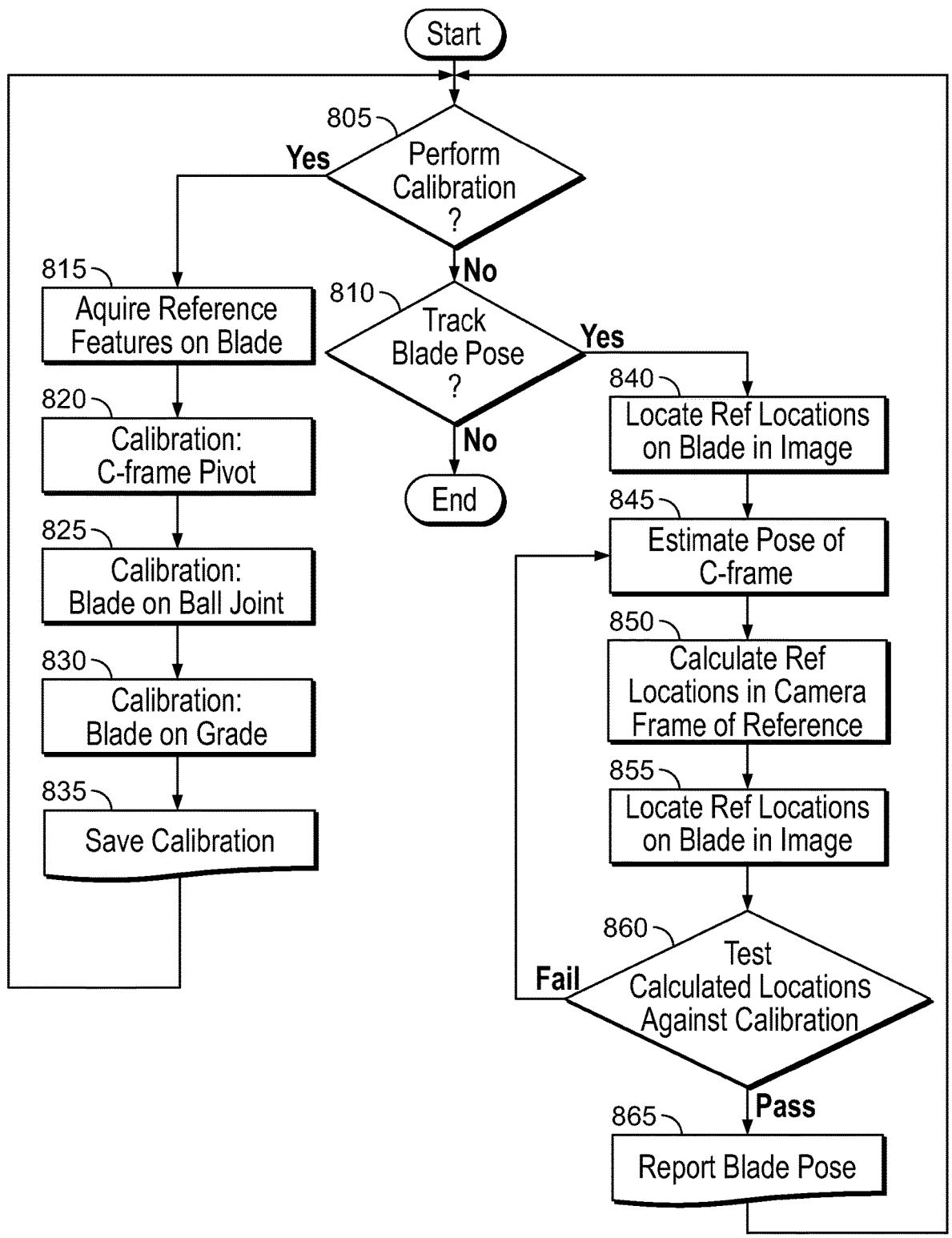
FIG. 8 shows a flowchart of illustrative operations for a sensor system for blade pose or position with respect to a machine in accordance with an embodiment.

FIG. 8 shows a flowchart of illustrative operations 800 for a sensor system for blade pose or position with respect to a machine in accordance with an embodiment. In step 805, there is an evaluation whether a calibration is to be performed for the current installation. This decision can be informed by the history of the installation (stored in a memory) or as input from a conventional user interface. At step 815, the calibration for the vision system to acquire features in image (e.g., image 640) of the blade is made which correspond to reference locations (e.g., 410, and 420) on the blade (e.g. blade 110). Features are identified by a special descriptor which may include but is not limited to information including the position of the feature on the blade, the properties of some neighborhood of the point, the orientation of the feature, or the trajectory of the feature locations (e.g., feature location 715) in a series of images (e.g. image 640) captured by the visual system. At step 820, the calibration captures the pivot location (e.g., pivot location 190) for the C-frame (e.g., C-Frame 180) of the dozer (e.g., dozer 100) in the vision system frame of reference. For this and the ensuing calibration steps, in FIG. 8, it is assumed that distance measurement devices (e.g. yo-yos) are temporarily installed between the camera (e.g., camera 120) and reference locations on the blade (e.g., reference locations 410 and 420). To perform this step of the calibration, blade 110 is held fixed with respect to the ball joint (e.g., ball joint 460). Distances (e.g., distance 710) and image locations (e.g., image location 715) for each of the reference locations 410 and 420 on blade 110 are then captured for at least three (3) positions of C-frame 180. In a well understood fashion, the locations of the points corresponding to the reference locations 420 and 430 on blade 110 in the vision system frame of reference can be calculated. The pivot axis for pivot location 190 of C-frame 180 is identical with a line between the centers of two circles fit respectively to the set of points associated with each side.

In a similar fashion, the position of blade 110 with respect to ball joint 460 can be characterized in step 825. In this case, C-frame 180 is fixed in place at an elevation allowing the maximum range of motion of blade 110 about the ball joint 460 that is practical. Distances (e.g., distance 710) and image locations (e.g., image location 715) for each of the reference locations 410 and 420) on blade 110 can be collected and the associated points corresponding to the corners of the spherical patches (e.g., patches 440 and 450) are calculated. In a well understood fashion, the center location and radius of sphere 430 associated with each patch 440 and 450 can be calculated from the points corresponding to the corners of such patches. The center of sphere 430 associated with patches 440 and 450 are coincident with the center of ball joint 460.

In the step 830, the final step of calibration, with dozer 100 on a flat surface and with blade 110 also at rest on that surface, distance(s) 710 and image location(s) 715 for each of the reference locations 410 and 420 on blade 110 are collected and the associated point locations in the visual system frame of reference calculated. This data will serve to provide a zero position for use by machine control in grading in a conventional manner. The calibration procedure is completed by saving, at step 835, the calculated values for use in calculation of blade pose during operation and editing the installation history to reflect a successful calibration. In operation (i.e. cyclic reporting of blade pose), the decision, at step 805, to perform the calibration steps evaluates to "no" and the following decision, at step 810, to track blade pose evaluates to "yes". In this case, the first task at step 840 in the operational cycle is to locate the features of the blade in image 715 using the same techniques as during calibration, as detailed above.

In one embodiment the next step, at step 845, is to estimate the orientation (i.e., pose) of C-frame 180 with respect to the vision system frame of reference. Methods for generating this estimate may include but are not limited to an arbitrary fixed value which may or may not be tailored to the installation, an approximation based on feature locations in image 715, or a trajectory of C-frame 180 motion based on the immediately preceding determined orientations. In a well understood fashion, it is then possible to calculate locations in the vision system frame of reference for the reference locations 410 and 420) on blade 110, at step 850 from the estimated orientation of C-frame 180 and the feature locations in image 715. The distance between these calculated locations can be calculated, at step 855, and tested at step 860 against the distance between the reference locations found during the calibration. The error evaluated during this test is used to modify the estimated pose of C-frame, from step 845, and the loop is continued, at step 860, until the error evaluated during the test is deemed small enough (e.g., within some error threshold value) to report a result for blade pose at step 865.

Figure 9:
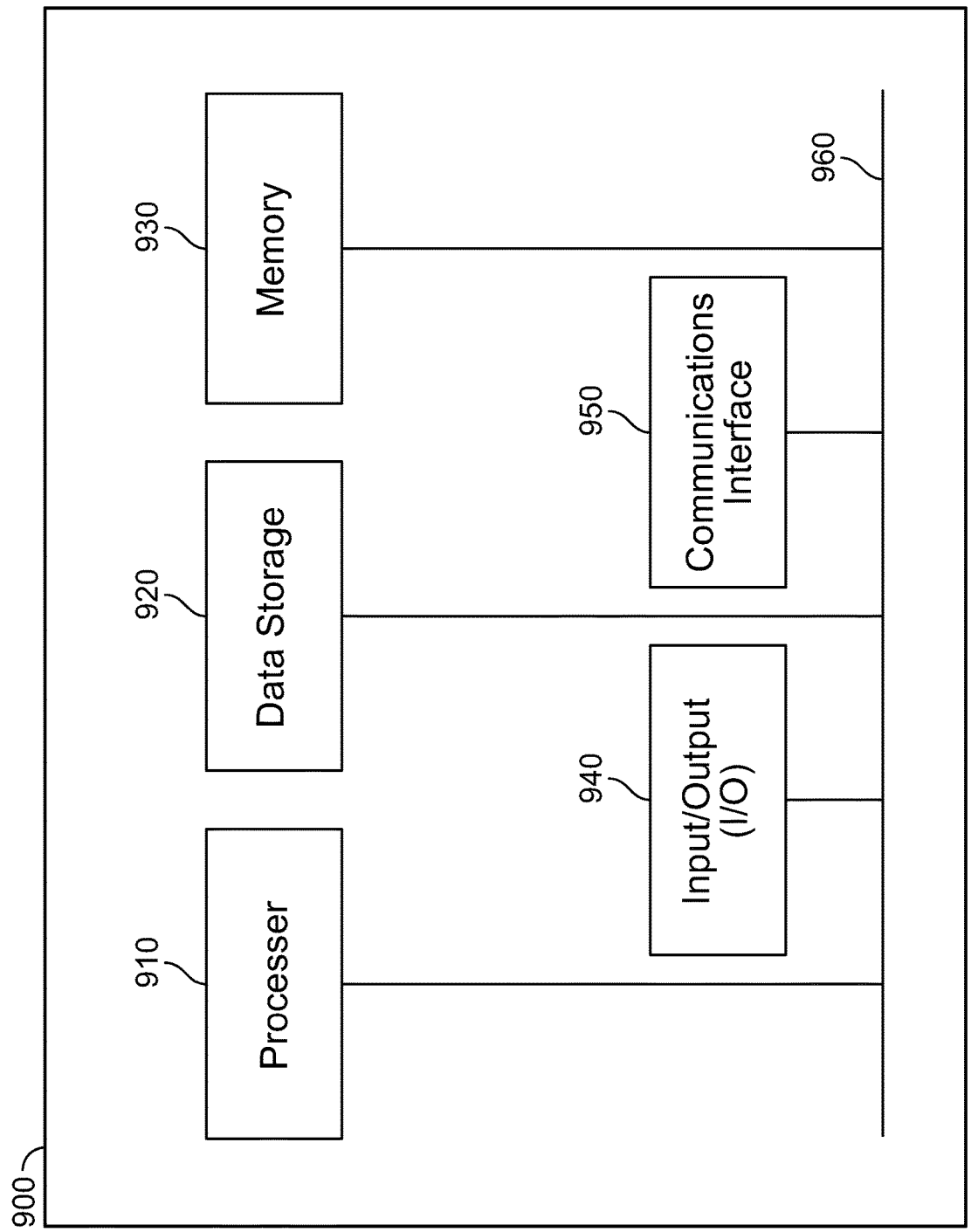
FIG. 9 shows a high-level block diagram of an exemplary computer in accordance with an embodiment.

As detailed above, the various embodiments herein can be embodied in the form of methods and apparatuses for practicing those methods. The disclosed methods may be performed by a combination of hardware, software, firmware, middleware, and computer-readable medium (collectively "computer") installed in and/or communicatively connected to a user apparatus. FIG. 9 is a high-level block diagram of an exemplary computer 900 that may be used for implementing a method for vision-based blade positioning in accordance with the various embodiments herein. Computer 900 comprises a processor 910 operatively coupled to a data storage device 920 and a memory 930. Processor 910 controls the overall operation of computer 900 by executing computer program instructions that define such operations. Communications bus 960 facilitates the coupling and communication between the various components of computer 900. The computer program instructions may be stored in data storage device 920, or a non-transitory computer readable medium, and loaded into memory 930 when execution of the computer program instructions is desired. Thus, the steps of the disclosed method (see, e.g., FIG. 8 and the associated discussion herein above) can be defined by the computer program instructions stored in memory 930 and/or data storage device 920 and controlled by processor 910 executing the computer program instructions. For example, the computer program instructions can be implemented as computer executable code programmed by one skilled in the art to perform the illustrative operations defined by the disclosed method. Accordingly, by executing the computer program instructions, processor 910 executes an algorithm defined by the disclosed method. Computer 900 also includes one or more communication interfaces 950 for communicating with other devices via a network (e.g., a wireless communications network) or well-known communications protocol(s). For example, such communication interfaces may be a receiver, transceiver or modem for exchanging wired or wireless communications in any number of well-known fashions. Computer 900 also includes one or more input/output devices 940 that enable user interaction with computer 900 (e.g., camera, display, keyboard, mouse, speakers, microphone, buttons, etc.).

Processor 910 may include both general and special purpose microprocessors, and may be the sole processor or one of multiple processors of computer 900. Processor 910 may comprise one or more central processing units (CPUs), for example. Processor 910, data storage device 920, and/or memory 930 may include, be supplemented by, or incorporated in, one or more application-specific integrated circuits (ASICs) and/or one or more field programmable gate arrays (FPGAs).

Data storage device 920 and memory 930 each comprise a tangible non-transitory computer readable storage medium. Data storage device 920, and memory 930, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 940 may include peripherals, such as a camera, printer, scanner, display screen, etc. For example, input/output devices 940 may include a display device such as a cathode ray tube (CRT), plasma or liquid crystal display (LCD) monitor for displaying information to the user, a keyboard, and a pointing device such as a mouse or a trackball by which the user can provide input to computer 900.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A vision system for determining a position of an implement attached to a machine, the vision system comprising:
   an image acquisition device for taking an image of the implement, the image acquisition device positioned (i) to view at least two points of interest located distally on the implement such that the at least two points of interest are visible in the image for an entire range of motion of the implement, and (ii) such that any combination of motions of the implement sharing an origin will cause the at least two points of interest to be mapped to an image plane of the image acquisition device by an azimuthal projection;
   a processor; and
   a memory to store computer program instructions, the computer program instructions when executed on the processor cause the processor to perform operations comprising:
      calculating respective locations of the at least two points of interest within spherical patches of a vision system frame of reference of the vision system by reversing a projection of the at least two points of interest in the image using respective locations of the points of interest in the image and a known geometry of an articulation of the implement about the machine.

2. The vision system of claim 1, wherein the operations further comprise:
   calibrating the vision system by:
      collecting, for a plurality of positions of the implement representing a motion of the implement about a respective center of rotation for each position of the plurality of positions, a plurality of images and a plurality of distances associated with the at least two points of interest; and
      calculating a respective location for each of the respective centers of rotation in the vision system frame of reference.

3. The vision system of claim 2, wherein the machine is a bulldozer and the implement is a blade, the at least two points of interest are located at respective upper distal corners of the blade, and the vision system further comprises:
   a ball joint of the blade having a finite range of rotational motion about a center thereof, and
   a C-frame of the bulldozer, wherein the ball joint is carried by and in an arc of fixed radius about a fixed axis of rotation on the C-frame.

4. The vision system of claim 1, wherein the at least two points of interest are associated with a respective target affixed to the implement.

5. The vision system of claim 1, wherein the operations further comprise:
   selecting one or more visual features of the implement, wherein the one or more visual features of the implement are selected from at least one of: (i) one or more edges or line elements and a corresponding image orientation thereof, (ii) one or more geometric shapes and associated geometric proportions; (iii) variations in color or intensity: (iv) a combination of features including relationships between them; (v) a region of the image in which the one or more visual features is found; and (v) a trajectory of the one or more visual features in the image plane; and
   acquiring the at least two points of interest by evaluating the one or more visual features selected using a plurality of object recognition operations.

6. The vision system of claim 3, wherein the calibrating the vision system operation further comprises:
   determining the fixed axis of rotation of the C-frame;
   determining the arc of fixed radius of the ball joint about the fixed axis of rotation of the C-frame;
   determining a respective first distance of each the at least two points of interest on the implement from the center of the ball joint; and
   determining a respective second distance between the at least two points of interest on the implement.

7. The vision system of claim 6, wherein the calibrating the vision system operation further comprises:
   determining a reference position for the blade wherein the reference position is a known location of the blade with respect to a frame of reference of the machine.

8. The vision system of claim 3, wherein the operations further comprise: determining a position of the blade by:
   acquiring an image having each of the at least two points of interest shown therein;
   determining an orientation of the C-frame by minimizing an error threshold, the error threshold defined using at least one distance from the plurality of distances, of a calculated distance between the at least two points of interest; and outputting of respective locations of the at least two points of interest upon reaching the error threshold minimized.

9. The vision system of claim 1, the method further comprising determining corners of the two spherical patches and recording those corners to a pixel location in the image.

10. The vision system of claim 1, wherein the azimuthal projection is a far-side general perspective type.

11. The vision system of claim 1, wherein the processor to performs a further operation comprising:
associating a first of the two spherical patches to a port patch of the image; and
associating a second of the two spherical patches to a starboard patch of the image.

12. A method for determining a position of an implement attached to a machine, comprising:
acquiring, from an image acquisition device, an image of the implement, wherein the image acquisition device is positioned (i) to view at least two points of interest located distally on the implement such that the at least two points of interest are visible in the image for an entire range of motion of the implement; and (ii) such that any combination of motions of the implement sharing an origin will cause the at least two points of interest to be mapped to an image plane of the image acquisition device by an azimuthal projection; and
calculating, using a processor, respective locations of the at least two points of interest within spherical patches of a vision system frame of reference of a vision system by reversing a projection of the at least two points of interest in the image using respective locations of the points of interest in the image and a known geometry of an articulation of the implement about the machine.

13. The method of claim 12, further comprising:
calibrating the vision system by:
collecting, for a plurality of positions of the implement representing a motion of the implement about a respective center of rotation for each position of the plurality of positions, a plurality of images and a plurality of distances associated with the at least two points of interest; and
calculating a respective location for each of the respective centers of rotation in the vision system frame of reference.

14. The method of claim 13, wherein the machine is a bulldozer having a C-frame, the implement is a blade having a ball joint carried by and in an arc of fixed radius about a fixed axis of rotation on the C-frame, the at least two points of interest are located at respective upper distal corners of the blade, and the ball joint of the blade having a finite range of rotational motion about a center thereof.

15. The method of claim 12, further comprising:
associating the at least two points of interest with a respective target affixed to the implement.

16. The method of claim 12, further comprising:
selecting one or more visual features of the implement, wherein the one or more visual features of the implement are selected from at least one of: (i) one or more edges or line elements and a corresponding image orientation thereof; (ii) one or more geometric shapes and associated geometric proportions; (iii) variations in color or intensity: (iv) a combination of features including relationships between them; (v) a region of the image in which the one or more visual features is found; and (v) a trajectory of the one or more visual features in the image plane; and
acquiring the at least two points of interest by evaluating the one or more visual features selected using a plurality of object recognition operations.

17. The method of claim 14, wherein the calibrating the vision system further comprises:
determining the fixed axis of rotation of the C-frame;
determining the arc of fixed radius of the ball joint about the fixed axis of rotation of the C-frame;
determining a respective first distance of each the at least two points of interest on the implement from the center of the ball joint; and
determining a respective second distance between the at least two points of interest on the implement.

18. The method of claim 17, wherein the calibrating the vision system further comprises:
determining a reference position for the blade wherein the reference position is a known location of the blade with respect to a frame of reference of the machine.

19. The method of claim 14, further comprising:
determining a position of the blade by:
acquiring an image having each of the at least two points of interest shown therein;
determining an orientation of the C-frame by minimizing an error threshold, the error threshold defined using at least one distance from the plurality of distances, of a calculated distance between the at least two points of interest; and
outputting of respective locations of the at least two points of interest upon reaching the error threshold minimized.

20. The method of claim 12, the method further comprising determining corners of the two spherical patches and recording those corners to a pixel location in the image.

21. The method of claim 12, wherein the azimuthal projection is a far-side general perspective type.

22. The method of claim 12, further comprising:
associating a first of the two spherical patches to a port patch of the image; and
associating a second of the two spherical patches to a starboard patch of the image.

* * * * *